UNITED STATES PATENT OFFICE.

LEWIS FRANCIS, OF NEW YORK, N. Y., ASSIGNOR TO LEWIS FRANCIS AND CYRUS H. LOUTREL.

IMPROVED COMPOSITION FOR MAKING PRINTERS' INKING-ROLLERS.

Specification forming part of Letters Patent No. 41,887, dated March 8, 1864; Reissue No. 1,772, dated September 27, 1864.

DIVISION B.

*To all whom it may concern:*

Be it known that I, LEWIS FRANCIS, of New York, in the county and State of New York, have invented, made, and applied to use a new and improved Composition for the Manufacture of Printers' Inking-Rollers of a Superior Character; and I do declare the following to be a full, clear, and correct description of the same.

The nature of my invention consists in combining sugar or any other saccharine matter with glue and glycerine to form an improved composition for the manufacture of printers' inking-rollers.

To enable those skilled in the arts to make and use my invention, I will speak of my mode of manufacturing the same.

In making my improved composition the ingredients employed are combined in about the following proportions, namely: glue, fifteen (15) pounds; glycerine, twenty (20) pounds; sugar or any other saccharine matter, ten (10) pounds. The glue is first soaked in water for about five minutes, in order that it, (the glue,) when added to the glycerine, may be thoroughly incorporated with it. The glycerine is placed in a steam-kettle and heated to the temperature of about 200° Fahrenheit, and the glue and sugar or other saccharine matter employed are added gradually to the glycerine, the latter being kept well stirred until all the ingredients have been added and thoroughly incorporated with the glycerine.

The composition thus formed may be cast into thin sheets or cakes of any desired form. The sheets or cakes are exposed to the air several days, in order that any water remaining in the composition may be thoroughly evaporated; or a vacuum-pan may be employed, if desired.

All the advantages claimed for the composition described in Division A of the present application are possessed by a composition thus made.

I do not wish to be understood as intending to confine myself to the use of the ingredients named herein, in the proportions in which they are herein set forth, as I am well aware that these proportions may be (advantageously in some cases) varied.

Having thus described my invention, what I claim as new, and desire to secure by Letters Patent, is—

Combining sugar or any other saccharine matter with glue and glycerine to form a composition for the manufacture of printers' inking-rollers.

LEWIS FRANCIS.

In presence of—
A. SIDNEY DOANE,
FRANK C. VAN TASSEL.